Figure 1:
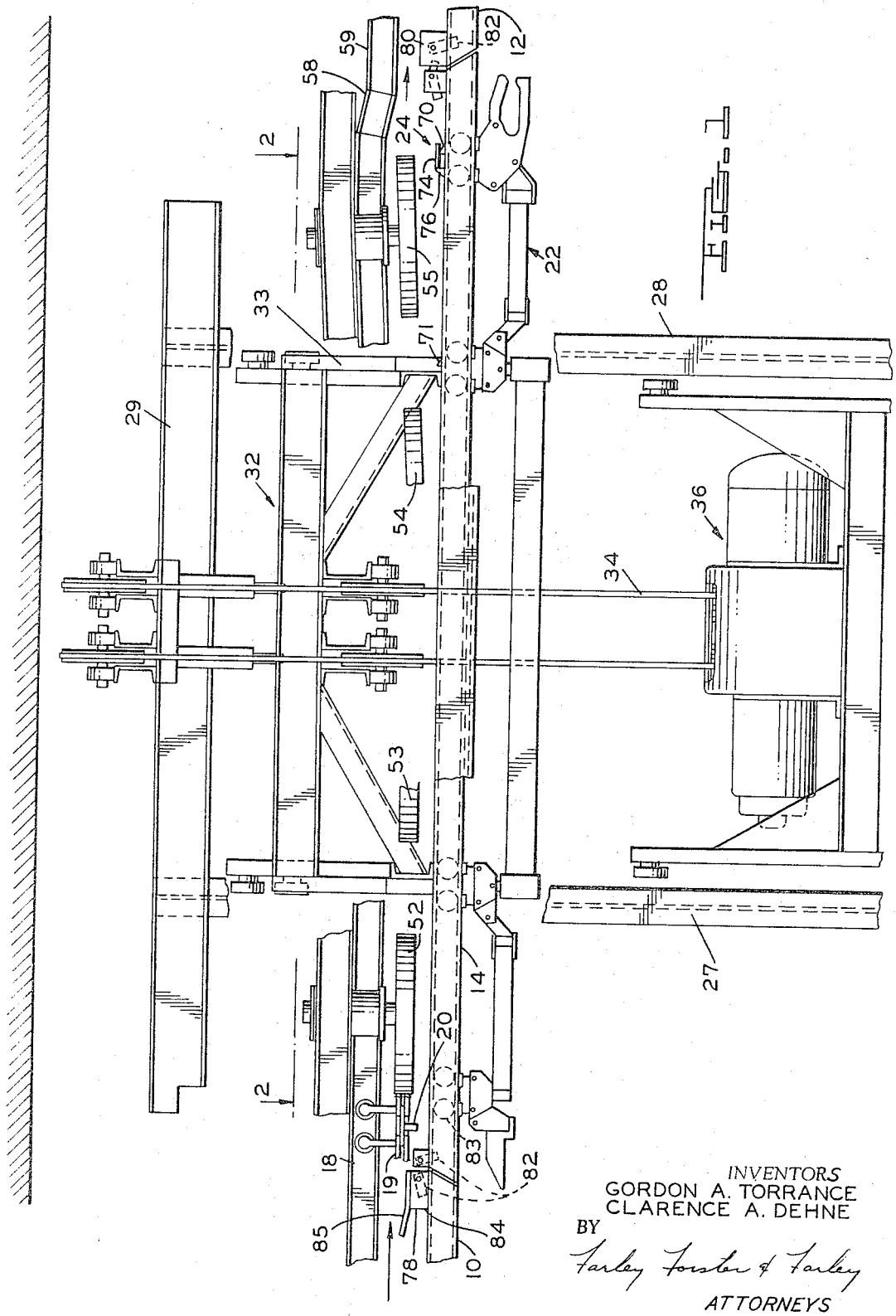

June 20, 1967　　　G. A. TORRANCE ET AL　　　3,326,139
LIFT SECTION FOR POWER AND FREE CONVEYOR
Filed May 13, 1965　　　　　　　　　　　　3 Sheets-Sheet 2

INVENTORS
GORDON A. TORRANCE
CLARENCE A. DEHNE
BY
*Farley, Forster & Farley*
ATTORNEYS June 20, 1967 G. A. TORRANCE ET AL 3,326,139
LIFT SECTION FOR POWER AND FREE CONVEYOR
Filed May 13, 1965 3 Sheets-Sheet 3

INVENTOR.
GORDON A. TORRANCE
CLARENCE A. DEHNE
BY
Farley, Forster & Farley
ATTORNEYS

United States Patent Office 3,326,139
Patented June 20, 1967

3,326,139
LIFT SECTION FOR POWER AND FREE
CONVEYOR
Gordon A. Torrance, Taylor, and Clarence A. Dehne, Orchard Lake, Mich., assignors to Jervis B. Webb Company, a corporation of Michigan
Filed May 13, 1965, Ser. No. 455,420
5 Claims. (Cl. 104—96)

This invention relates to an improved construction for a movable carrier supporting track section of a power and free conveyor, particularly a power and free conveyor employing elongated carriers each of which is supported from the carrier track by a plurality of trolleys.

Such vertically movable track sections are frequently employed in conveyor systems—for example, for the loading or unloading of a carrier. The movable track section is normally aligned with and forms a part of the carrier supporting track, the carrier is propelled onto the movable track section, stopped, the movable section is lowered while the operation is performed, and then returned back to the normal aligned relation for further movement of the carrier along the carrier track.

In the conventional power and free conveyor the carrier supporting track is arranged parallel to and below a track for the trolleys which support an endless chain equipped with pushers for propelling the carriers along the carrier track by engagement with driving dogs on the carriers; and the carrier track is suspended from the propelling member track by hangers. Prior constructions for movable track sections have either involved extensive structure for supporting the movable track members or have involved some auxiliary mechanism for propelling the carrier onto and off of the movable track section, the propelling member supporting track being routed around rather than through the movable track section.

The principal object of the present invention is to provide a simplified construction for a movable track section of the type discussed having a minimum of supporting structure for supporting the movable track members for vertical movement, and at the same time permitting the propelling member track to extend through the movable track section so that carriers are moved onto the section and off of the section by pushers of the propelling member.

The vertically movable track section construction of the invention comprises vertically extending frame structure disposed to one side of the path of carrier travel, a carriage mounted on this frame structure, cantilever track supporting means mounted on the carriage and extending transversely across and above the path of carrier travel, means securing the movable track section to the track supporting means in depending relation therewith and in normally aligned relation with the carrier track, elevator means for moving the carriage vertically and an arrangement which permits a carrier to be propelled along the movable track section by movement of the propelling member and pusher means of the power and free conveyor when the movable track section is aligned with the carrier track thereof, including an offset portion in the propelling member track extending around said cantilever track supporting means, a leading and trailing pusher on the propelling member spaced apart a distance less than the length of said offset track portion, and leading and trailing driving dogs on the carrier spaced apart a distance less than said pusher spacing but not less than length of the movable track section adjacent the offset portion, the carrier being propelled by successive engagement between the trailing pusher and trailing driving dog and the leading pusher and the leading driving dog.

Figure 2:
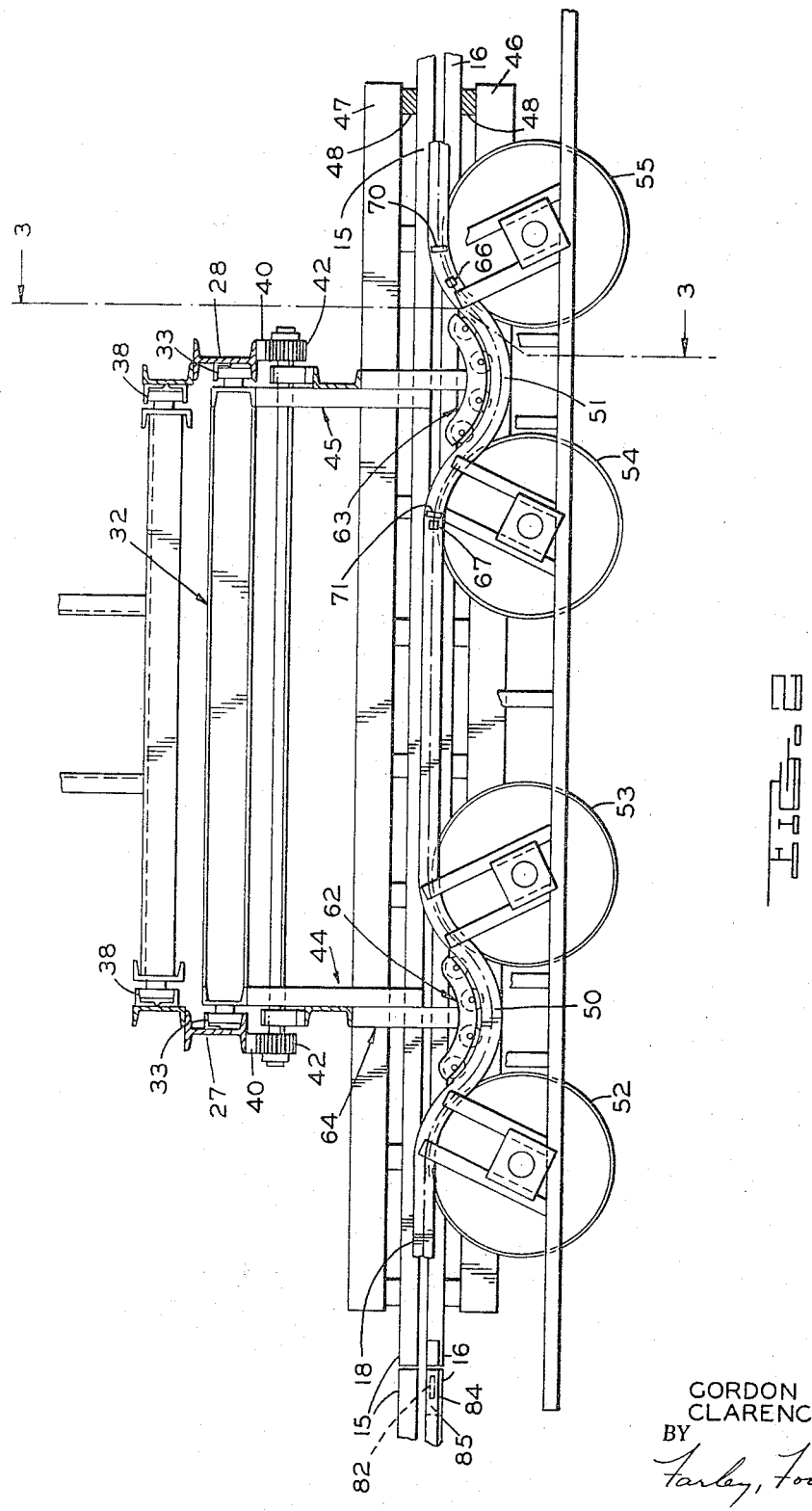

A representative embodiment of the invention is disclosed in the accompanying drawings in which:

FIGURE 1 is a side elevation of the movable track section structure with parts of the propelling member track and propelling member guides being broken away;
FIGURE 2 is a sectional plan view taken as indicated by the line 2—2 of FIG. 1; and
FIGURE 3 is a transverse sectional elevation as indicated by the line 3—3 of FIG. 1, the carrier structure being omitted.

In FIG. 1, reference numeral 10 at the left and 12 at the right designate the ends of a carrier supporting track of a power and free conveyor, between which a vertically movable carrier supporting track 14 is mounted, the track end 10 being adjacent the entrance to the movable track 14 and the track 12 being adjacent the exit thereof. The tracks 10, 12 and 14 are each formed by a pair of channel section members 15 and 16 arranged in parallel transversely spaced relation as shown in FIGS. 2 and 3. An I-beam track member 18 is mounted above the tracks 10–14 and supports an endless propelling chain 19 equipped with pusher means 20. The track 18 extends through the movable track section, in a manner to be described more completely, to propel a carrier 22 onto and off of the movable track 14 by engagement between pusher means 20 on the chain 19 and driving dog means generally designated 24 on the carrier.

The movable track section construction includes suitable vertically extending frame structure 26 disposed adjacent and to one side of the path of carrier travel and including a pair of main vertical beams 27–28 connected at their tops and bottoms by longitudinally extending channel members 29 and 30. A carriage 32 rolls in tracks 33 provided on the frame members 27–28 and is connected by cables 34 to a counter-weighted power unit 36 which floats in track members 38 carried by the frame members 27–28. The cables 34, the pulleys about which they are trained and the floating counter-weighted drive unit 36 comprise elevator means for moving the carriage vertically, and a pair of racks 40 mounted on the frame members 27, 28 are each engaged by cross-connected pinions 42 to equalize the carriage movement.

Figure 3:
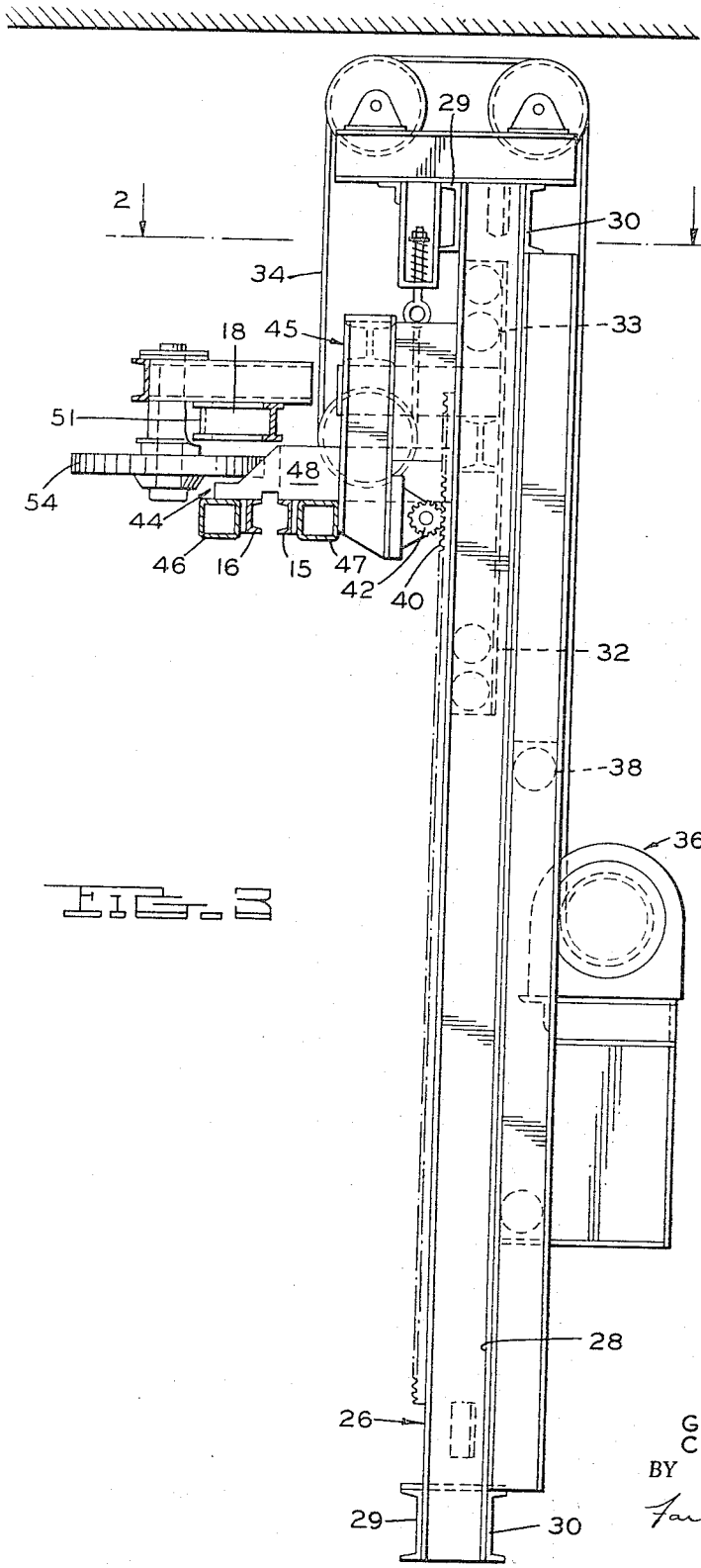

As best shown in FIGS. 2 and 3, a cantilever form of track supporting beam structure is provided at each of the longitudinal ends of the carriage, consisting of interconnected members, generally designated by the references 44 and 45, extending transversely across and above the path of carrier travel. The movable track section, which includes the track members 15 and 16 and a pair of reinforcing members 46 and 47 each joined to one of the track members by a series of spacers 48, is secured by suitable means to the cantilever supporting beam structures 44 and 45; the track members 15, 16, the reinforcing members 46 and 47 and the beam structures 44 and 45 all being interconnected. When the movable track section is in a position of alignment with the carrier supporting tracks 10 and 12, the cantilever supporting beam structures 44, 45 obstruct the straight-line path of travel of the propelling member supporting track 18.

Means are provided for forming an offset portion in the propelling member track 18 to extend this track around the supporting beam structures 44 and 45. The offset portions 50 and 51 are each formed by a reverse bend in the track member 18 and include suitable guides for the propelling chain 19. The guides for each offset portion include a pair of guide wheels 52 and 53 and 54 and 55, the guide wheels 52 and 53 being mounted for rotation on vertical axes located adjacent the beginning and the end of the offset track portion 50. The guide wheels 54 and 55 are also mounted for rotation on axes located adjacent the beginning and end of the offset track portion 51, but the axis of each of these wheels is inclined slightly to the vertical as shown in FIG. 1, following the slope of a rise in the track member 18. This rise is to increase the distance between the track 18 and the movable track section 14 toward the exit end thereof, and is followed by a quick drop section 58 in the track 18 adjacent the exit end of the movable track section 14 to return the propelling member and carrier supporting tracks to a normal spaced relation at 59. A roller nest 62 supported by suitable means 64 from the fixed frame structure guides the chain 19 intermediate each pair of guide wheels.

This arrangement of the offset track portions 50 and 51, when combined with a certain relation between pusher members on the chain 19 and driving dogs on carrier 22 permit a carrier to be propelled along the movable track section when in alignment with the carrier supporting tracks 10 and 12 in accordance with the teaching contained in the co-pending application of Clarence A. Dehne, Ser. No. 369,231, now Patent No. 3,247,806. This relation is schematically illustrated in FIG. 2 and includes a leading pusher 66 and trailing pusher 67 on the chain 19 which are spaced apart a distance less than the length of one of the offset portions 50 or 51; and a leading driving dog 70 and trailing driving dog 71 on the carrier 22 which are spaced apart a distance less than the pusher spacing but not less than the length of the movable track section 14 adjacent the offset track portions 50 and 51.

As a result, a carrier can be propelled along the movable track section with only a slight interruption in its movement. When the leading carrier driving dog 70 reaches the beginning of one of the offset portions, the leading pusher 66 moves laterally out of engagement with it, interrupting drive to the carrier until the trailing carrier driving dog 71 is overtaken by the trailing pusher 67 which advances the carrier leading driving dog 70 into a position for successive reengagement by the leading pusher 66 as the latter reaches the other end of the longer offset portion.

When the carrier has been thus advanced onto the movable track section, it is halted by a stop member 74 (FIG. 1) which is moved by suitable means not shown into the path of travel of the leading carrier driving dog 70 which is depressed to a non-driving position upon contact with the stop 74 and the carrier is halted by abutment between the stop member and the carrier holdback dog 76.

The rise in the propelling member track 18 is provided to permit the pushers to clear the holdback dog 76 when the carrier is stopped, this dog being shorter than the driving dog 70 when the latter is in its extended normal driving position.

Suitable, interlocking blocking devices 78 and 80 (FIG. 1) are provided at the adjacent ends of the stationary and movable track members 10, 12 and 14 for preventing a carrier from moving off the end of any of these track members when the movable track section is shifted to a non-aligned position relative to the tracks 10 and 12. These blocking devices are mounted on the upper flange of the carrier supporting rails 15 and 16 and include movable stops, generally designated 82, which are pivotally supported in a housing 84 and depend into the path of the wheels of the trolleys 83. As shown at the left side of FIGS. 1 and 2, the housings 84 are preferably provided with a guide rail 85 above and overlying the movable stops 82 which prevents the chain and pushers from jamming into the movable stops.

While preferred embodiments have been described above in detail, it will be understood that numerous modifications might be resorted to without departing from the scope of the invention as defined in the following claims.

We claim:
1. A vertically movable track section for a power and free conveyor having a carrier travelling on a supporting track, a track adjacent thereto supporting an endless propelling member having pusher means thereon engageable with driving means on a carrier; comprising vertically extending frame structure disposed to one side of the path of carrier travel, a carriage mounted on said frame structure, a cantilever track supporting member mounted on the carriage and extending transversely across and above the path of carrier travel, means securing the movable track section to said track supporting member in depending relation therewith and in normally aligned relation with the carrier track, elevator means for moving the carriage, and means whereby a carrier can be propelled along said movable track section by movement of the propelling member when the movable track section is aligned with the carrier track including an offset portion in the propelling member track extending around said track supporting member, a leading and trailing pusher on the propelling member spaced apart a distance less than the length of said offset track portion, and leading and trailing driving dogs on the carrier spaced apart a distance less than said pusher spacing but not less than the length of the movable track section adjacent said offset track portion, the carrier being propelled by successive engagement between a trailing pusher and trailing driving dog and leading pusher and leading driving dog.

2. A movable track section for a carrier supporting track of a power and free conveyor comprising vertically extending frame structure disposed to one side of the path of carrier travel on said movable track section, a carriage mounted on said frame structure, a cantilever track supporting member mounted on said carriage and extending transversely across and above said movable track section, means securing said movable track section to said track support member in depending relation therewith, a propelling member track mounted above the movable track section, and means providing an offset portion in the propelling member track extending around said support member in clearance relation therewith.

3. A movable track section as claimed in claim 2 wherein the movable track section comprises a pair of transversely spaced track members, a track reinforcing member extending longitudinally adjacent each of said track members, and means interconnecting said track members and said reinforcing members with said track support member.

4. A lift section as claimed in claim 2 wherein said means providing an offset portion in the propelling member track includes a pair of longitudinally spaced propelling member guide wheels, and means mounting each of said guide wheels for rotation on a vertical axis adjacent one of the ends of said offset track portion.

5. A lift section as claimed in claim 2 further including at least one blocking device at an end of the movable track section, said blocking device including a housing, a movable stop member mounted therein and a guide rail mounted on the housing above and overlying said stop member.

No references cited.

ARTHUR L. LA POINT, *Primary Examiner.*

J. E. BABER, *Assistant Examiner.*